United States Patent [19]
Hauser et al.

[11] Patent Number: 5,980,053
[45] Date of Patent: Nov. 9, 1999

[54] ILLUMINATING ARRANGEMENT

[75] Inventors: Norbert Hauser, Braunschweig; Claus-Peter Brückner, Lehre-Flechtorf; Heiko Reinke, Wolfenbüttel, all of Germany

[73] Assignee: Carl-Zeiss-Stiftung, Heidenheim, Germany

[21] Appl. No.: 09/040,946

[22] Filed: Mar. 19, 1998

[30] Foreign Application Priority Data

Mar. 20, 1997 [DE] Germany .......................... 197 11 599

[51] Int. Cl.[6] .................................................. F21V 19/04
[52] U.S. Cl. ............................................. 362/20; 362/581
[58] Field of Search ............................. 362/20, 581, 551

[56] References Cited

U.S. PATENT DOCUMENTS

| 4,402,038 | 8/1983 | Hartung et al. | 362/20 |
| 4,518,233 | 5/1985 | LiDonnici et al. | 353/87 |
| 4,557,554 | 12/1985 | Blanc | 362/581 X |
| 5,178,446 | 1/1993 | Gruber et al. | 362/20 |

FOREIGN PATENT DOCUMENTS

| 0594508 | 4/1994 | European Pat. Off. . |
| 3218699 | 11/1983 | Germany . |
| 3813035 | 11/1989 | Germany . |
| 2083195 | 3/1982 | United Kingdom . |

*Primary Examiner*—Stephen Husar
*Attorney, Agent, or Firm*—Walter Ottesen

[57] ABSTRACT

An illuminating arrangement (1) includes a main lamp (7) and a reserve lamp (9) mounted on a lamp carrier (5). The lamp carrier (5) can be moved between a base position wherein the main lamp (7) provides illumination and a reserve position wherein the reserve lamp (9) provides illumination. When there is a failure of the main lamp (7), a position change mechanism (15, 19, 21) automatically pivots the lamp carrier (5) out of its base position into the reserve position.

10 Claims, 3 Drawing Sheets

nism whereby the reserve lamp, when active, is also always arranged in a position optimal for the illumination.

When the pivotable lamp carrier and the position change mechanism are mounted on an insert which is movable into and out of the illuminating arrangement, a defective main lamp and/or a defective reserve lamp can be quickly exchanged without difficulty outside of the illuminating arrangement which has a closed housing.

The insert is fixed in the housing of the illuminating arrangement by an insert latch mechanism which always permits the insert to be in one and the same position. In this way, the illuminating active lamp is always in one and the same work position when the insert is pushed into the housing of the illuminating arrangement.

In a further embodiment, a return element returns the lamp carrier from its reserve position into its base position when moving the insert out of the housing of the illuminating arrangement. In this way, no special measures are needed to bring the main lamp into operational readiness.

Advantageously, the lamp carrier includes an indicator element projecting out of the illuminating arrangement in its reserve position. This indicator element indicates the operation of the reserve lamp and therefore the necessity to exchange the apparently defective main lamp at the next opportunity.

In another embodiment, the position change mechanism includes a control element which is magnetically actuable when the main lamp becomes defective and which controls a spring resiliently biasing the lamp carrier into its reserve position. With this embodiment, an electric motor for pivoting the lamp carrier is unnecessary. In this way, the position change mechanism is especially simple and reliable.

When the control element is manually actuable via an unlatching element, reliability is increased. In this way, an emergency operation based on the reserve lamp is possible when there is a defective automatic detection of the illuminating state or for a defective control element actuating magnet. This emergency operation can be directly initiated by anyone.

A light conductor can be provided which transmits the light of the illuminating-active lamp to a location remote from the illuminating arrangement. When the light conductor is coupled to the illuminating arrangement, the illuminating arrangement can be protected by a closed housing which, in addition, makes possible a simple manipulation of the entire illuminating arrangement.

The light conductor can be connected to the illuminating arrangement so that it is latched thereto in order to establish a fixed pregiven positional relationship between an end face of the light conductor and the illuminating-active lamp. In this way, the work distance between the lamp and the light conductor, which is optimal for coupling the illuminating light into the light conductor, can be easily achieved and reliably reproduced for each new use of the illuminating arrangement.

BRIEF DESCRIPTION OF THE DRAWINGS

The invention will now be described with reference to the drawings wherein.

ILLUMINATING ARRANGEMENT

FIELD OF THE INVENTION

Figure 1:
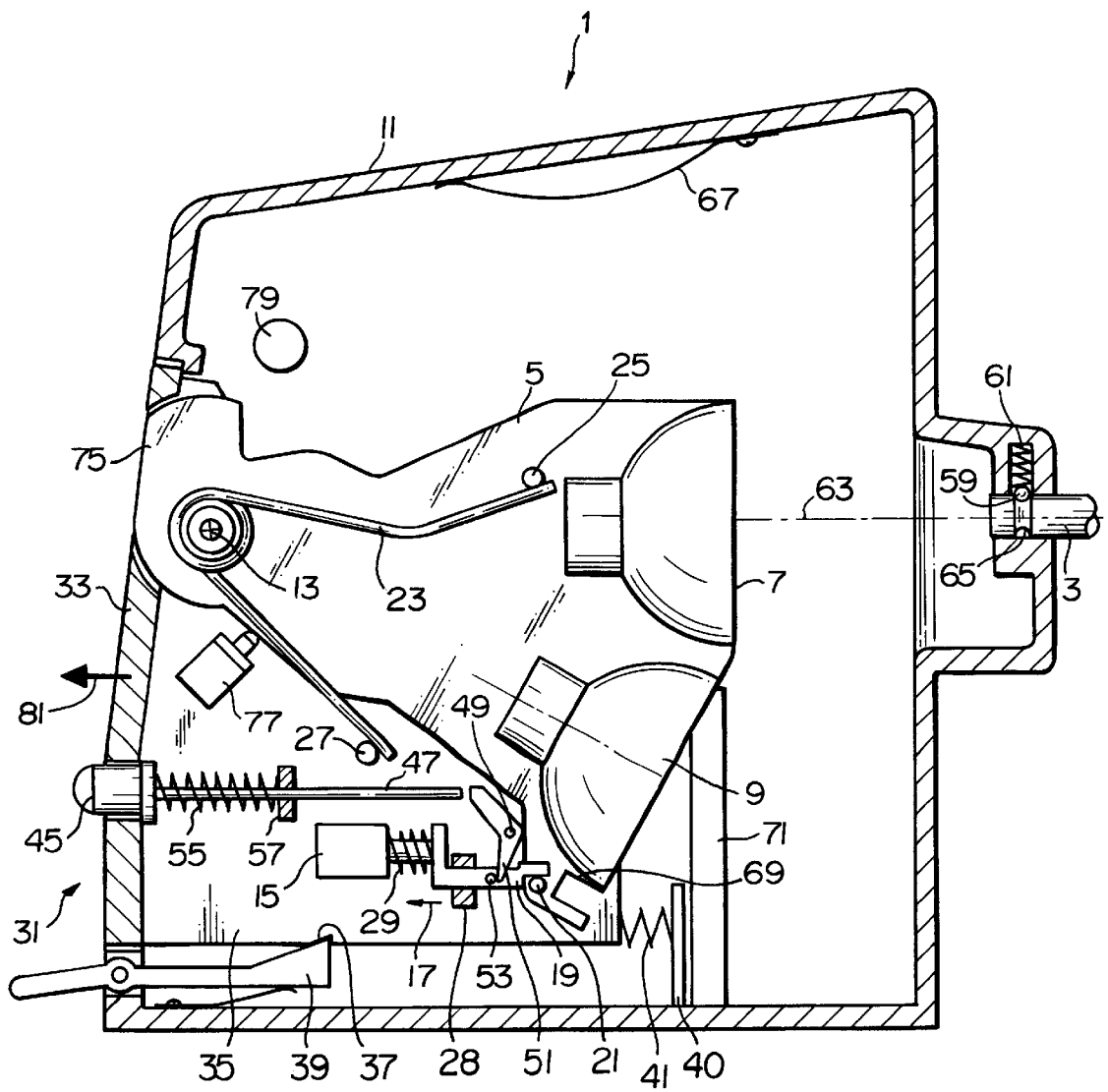
FIG. 1 is a view, partially in section, of an embodiment of the illuminating arrangement of the invention showing the lamp carrier in its base position.

The invention relates to an illuminating arrangement having a main lamp and a reserve lamp which are mounted on a lamp carrier. The lamp carrier is movable between a base position wherein the main lamp provides illumination and a reserve position wherein the reserve lamp provides illumination. A position change mechanism moves the lamp carrier automatically from the base position into the reserve position when the main lamp becomes defective.

BACKGROUND OF THE INVENTION

An illuminating arrangement of this kind having a main lamp and a reserve lamp is disclosed in German patent publication 3,813,035. The main lamp and reserve lamp are mounted on a lamp carrier which is movable between a base position wherein the main lamp illuminates and a reserve position wherein the reserve lamp illuminates. The lamp carrier described in German patent publication 3,813,035 is a sled guided on a guide rail. The lamp carrier is automatically moved out of the base position into the reserve position by a position change mechanism when the main lamp becomes defective.

An illuminating arrangement is also known from German patent publication 3,218,699 wherein a lamp carrier is displaced out of the base position into the reserve position with the aid of a motor. The lamp carrier here is likewise configured as a sled. The motor is coupled to the lamp carrier via a transmission including several intermediate elements.

SUMMARY OF THE INVENTION

It is an object of the invention to provide an illuminating arrangement which is constructively simple, reliable, compact and usable without difficulty.

The illuminating arrangement of the invention includes: a frame; a lamp carrier; a main lamp and a reserve lamp mounted on the lamp carrier in spaced relationship to each other; the lamp carrier being pivotally mounted on the frame so as to be movable from a base position wherein the main lamp provides illumination into a reserve position wherein the reserve lamp provides illumination; and, a position change mechanism for automatically moving the lamp carrier from the base position into the reserve position when the main lamp becomes defective.

For a mechanically simple configuration of the illuminating arrangement, the free space, which must be provided for the movement of the lamp carrier, can be held small compared to the linear movement of a sled. This is so because of the pivotability of the lamp carrier out of the base position into the reserve position. Furthermore, a pivot movement with a simple and reliable position change mechanism can be achieved at relatively low cost. On the other hand, the illuminating arrangement, which is described in detail in German patent publication 3,218,699, has a linearly displaceable lamp carrier and a multicomponent position change mechanism which takes up a substantial amount of space.

When the position of the lamp carrier is fixed in its base position by the position change mechanism, a separate mechanism is unnecessary which holds the lamp carrier in its base position and therefore the main lamp in a reproducible position which is optimal for illumination.

Figure 2:
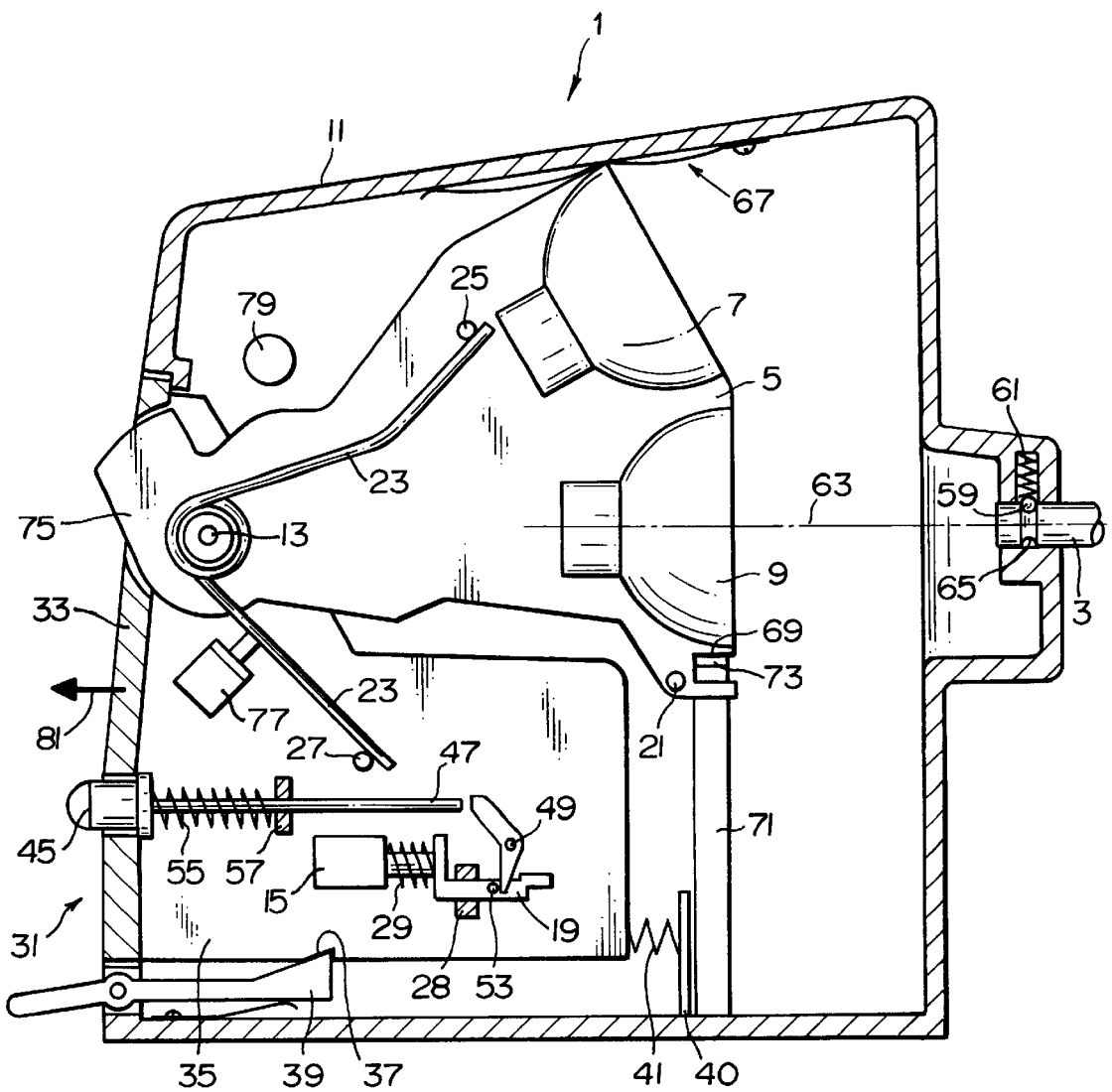
FIG. 2 is a schematic corresponding to the view of FIG. 1 but with the lamp carrier pivoted into the reserve position.
Figure 3:
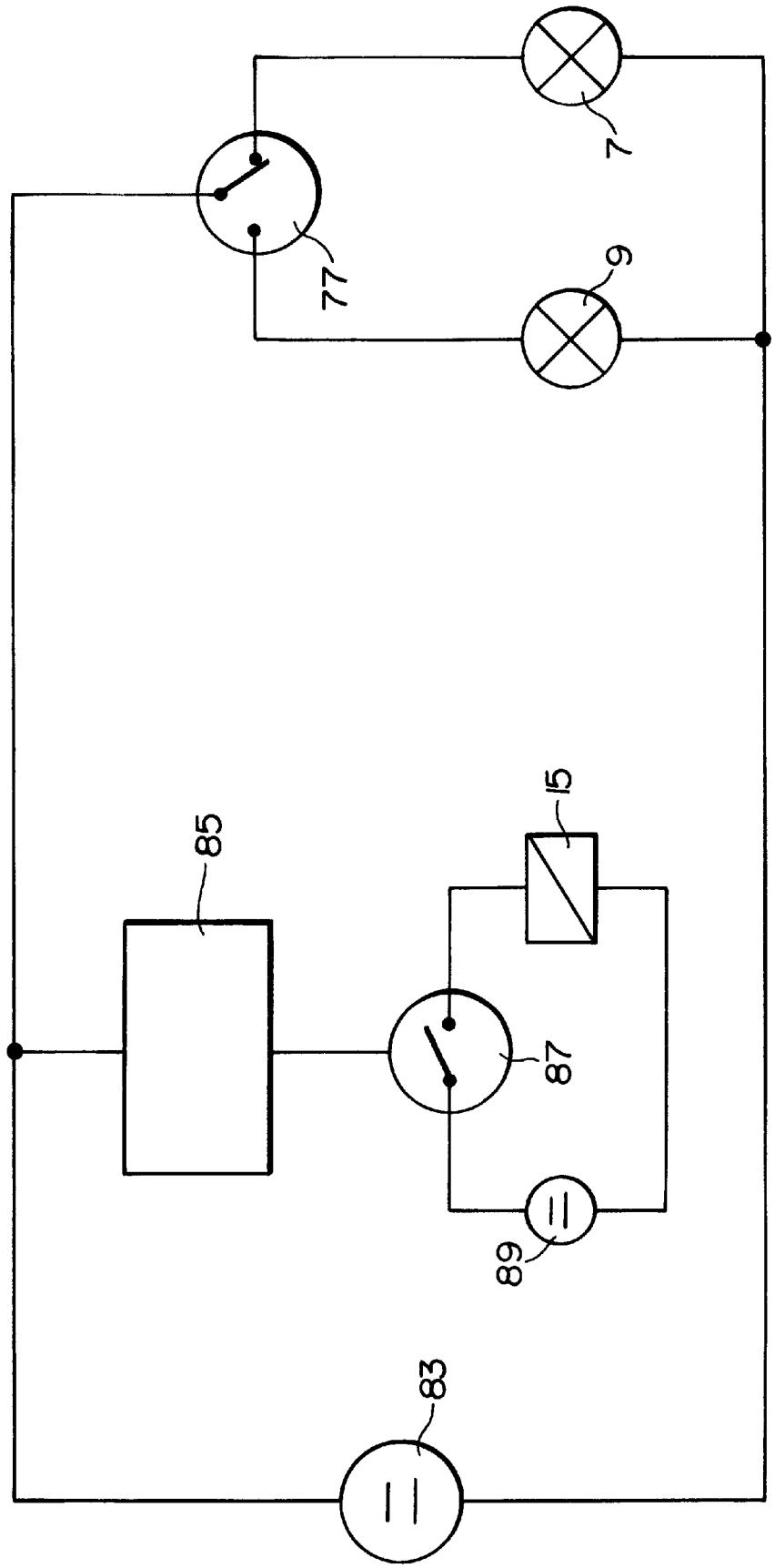

Advantageously, the position of the lamp carrier in its reserve position is fixed by a reserve-position latch mecha- FIG. 3 is a schematic of the electrical circuit for the illuminating arrangement shown in FIGS. 1 and 2.

DESCRIPTION OF THE PREFERRED EMBODIMENTS OF THE INVENTION

In FIG. 1, the illuminating arrangement 1 can advantageously be mounted on a stand of a surgical microscope, for example, in order to illuminate the viewing field of the corresponding surgical microscope with the aid of a fiber light conductor 3. Here it is noted that FIGS. 1 and 2 are schematic representations and that the electrical wiring is omitted for the sake of clarity and is known to those familiar with illuminating apparatus.

A lamp carrier 5 having a main lamp 7 and a reserve lamp 9 is accommodated in the housing 11 of the illuminating arrangement 1.

Reference numeral 13 identifies a rotational axis extending orthogonally to the plane of the drawing of FIG. 1. The lamp carrier 5 can be pivoted about rotational axis 13 from its base position shown in FIG. 1 into its reserve position shown in FIG. 2. In the base position, the main lamp 7 illuminates, that is, the main lamp 7 is disposed in this base position in a position wherein illuminating light is coupled into the light conductor 3. The reserve lamp 9 supplies the illuminating light in the reserve position shown in FIG. 2.

When the main lamp 7 becomes defective, the lamp carrier 5 is automatically pivoted out of its base position shown in FIG. 1 into the reserve position shown in FIG. 2 via a position changing mechanism. This position changing mechanism includes a control element in the form of a control slider 19.

This position changing mechanism further includes an electromagnet 15 which can displace the control slider 19 in the direction of arrow 17. In FIG. 1, the control slider 19 is shown in its latched position and the lamp carrier 5 is in its base position. In this position, a stop 21, which is formed on the lamp carrier, is resiliently biased against the control slider 19 by means of a torsion or leg spring 23. The lamp carrier 5 is pivotable relative to the control slider 19. The leg spring 23 is arranged on the lamp carrier 5 and is supported between a stop 25 and a stop 27. The stop 25 is formed on the lamp carrier 5 and the stop 27 is nonpivotable relative to the lamp carrier 5.

The lamp carrier 5 is held in the base position by the self locking between the control slider 19, the stop 21 and the linear guide 28 of the control slider 19. The self locking is based on the action of the leg spring 23. The position of the lamp carrier 5 in its base position and therefore the relative position between main lamp 7 and light conductor 3 is therefore defined by the position changing mechanism itself and is reproducibly fixed.

If the magnet 15 is excited with the malfunction of the main lamp 7, the control slider 19 is therefore pulled in the direction of arrow 17 against the spring force of a pressure spring 29 braced between the magnet 15 and the control slider 19. In this event, the stop 21 no longer lies against the control slider 19 whereby the leg spring 23 can pivot the lamp carrier 5 about the rotational or pivot axis 13 into the reserve position shown in FIG. 2.

When the magnet 15 is not excited, the control slider 19 is returned into its latched position shown in FIGS. 1 and 2 by the pressure spring 29 opposite to the direction of arrow 17. Furthermore, the pressure spring 29 ensures that the control slider 19 is returned into the latching position after the stop 21 has displaced the control slider 19 in the direction of arrow 17 during the return pivot of the lamp carrier 5 into the base position.

The lamp carrier 5 and the position change mechanism are arranged on the insert 31. The position change mechanism includes the magnet 15 and the control slider 19. The insert 31 is guided on guide rails (not shown in FIGS. 1 and 2) of the housing 11 and can be pulled out of the housing 11 of the illuminating arrangement 1 for exchanging defective lamps as required. Reference numeral 33 identifies a wall which is aligned with the housing 11 of the illuminating arrangement 1 in the inserted position of the insert 31 and in the base position of the lamp carrier 5. The actual insert chassis 35 extends from the wall 33 and carries the position change mechanism. The lamp carrier 5 is pivotally connected to the insert chassis 35 to pivot about pivot axis 13.

A latch lever 39 is spring biased into the position shown in FIGS. 1 and 2 and latches into a latch cutout 37 of the insert 31 when the insert chassis is inserted into the housing 11. The latch cutout 37 is pushed by a pressure spring 41 against the latch lever 39. The pressure spring 41 is supported between a stop 40 of the illuminating arrangement housing 11 and the insert chassis 35. The latch cutout 37 and the latch lever 39 as well as the abutment 40 and the pressure spring 41 therefore define an insert latch mechanism which holds the insert 31 in the illuminating arrangement housing 11 in a defined position.

To remove the insert 31 from the illuminating arrangement 1, the latch lever 39 is rotated against its spring pretensioning and is therefore moved out of the latch position (shown in FIGS. 1 and 2). In this way, the latch lever 39 disengages from latch cutout 37 and the insert 31 is pushed out of the illuminating arrangement 1 by the spring 41 so far that it can be completely pulled out manually in a simple manner without an ancillary tool.

An unlatching element 47 is configured as an unlatching rod and is provided to bring the reserve lamp 9 into use when the automatic position change mechanism, which includes the magnet 15, becomes defective. The unlatching rod 47 is manually actuable via a press button 45 and coacts with a two-arm lever 51. The lever 51 is rotatable about a rotational axis 49 orthogonal to the plane of the drawing of FIG. 1. For a rotation in the clockwise direction, the two-arm lever 51 displaces the control slider 19 in the direction of arrow 17 via a stop 53 configured on the control slider 19. A corresponding rotation of the two-arm lever 51 is effected by pressing the press button 45. The unlatching rod 47 is normally held at a spacing to the two-arm lever 51 by a pressure spring 55. The pressure spring 55 is braced between a stop 57, which is connected to the insert chassis 35, and the press button 45. The unlatching rod 47 is displaced in a direction opposite to that of arrow 17 in such a manner that it rotates the two-arm lever 51 about the rotational axis 49 in the clockwise direction via the lever arm of lever 51 remote from the control slider.

A spring-biased detent ball 59 is provided on the section of the housing 11 provided for receiving the light conductor 3. The detent ball is biased in a direction toward the optical axis 63 of the light-conductor arrangement by a spring 61 accommodated in a blind bore of the housing 11. The detent ball 59 latches into a corresponding annular slot 65 on the end of the light conductor whereby a defined positional relationship is established between the lamp and the light conductor 3 which is always reproducible.

FIG. 2 corresponds to FIG. 1 except that the lamp carrier 5 is shown pivoted into the reserve position.

A leaf spring 67 is mounted on the upper end of the housing 11 and dampens the pivot movement of the lamp carrier 5 as it moves into its reserve position and biases the lamp carrier 5 against the pretensioning of the leg spring 23. An edge of the cutout, which is formed in the lamp carrier 5, is biased against a projection 73 by the leaf spring 67. The projection 73 is formed on a leaf spring 71 mounted on the housing 11 and the projection 73 protrudes orthogonally to the plane of the drawing of FIG. 2. The leaf spring 71 can also be seen in FIG. 1 and is pretensioned orthogonally to the plane of the paper of FIGS. 1 and 2 in a direction toward the lamp carrier 5. The projection 73 engages in the cutout having edge 69 when the lamp carrier 5 is pivoted out of its base position into its reserve position. In this way, the reserve position of the lamp carrier 5 is also precisely determined and a defined positional relationship between the reserve lamp 9 and the light conductor 3 is guaranteed.

In FIG. 2, a section 75 of the pivotable lamp carrier 5 projects out of the insert wall 33 in the reserve position of the lamp carrier 5 thereby indicating that the reserve lamp 9 provides illumination. With the indicator section 75, a reliable indication of the operation of the reserve lamp is ensured which is relatively free of malfunction compared to known electrical indicating devices.

A switch 77 is switched by the pivot movement of the lamp carrier 5 from the base position into the reserve position. The switch 77 switches the energy supply to the reserve lamp 9 when the lamp carrier 5 is pivoted into its reserve position.

In addition, FIG. 2 shows a return projection 79, which is mounted on the housing 11 of the illuminating arrangement 1, and which urges the lamp carrier 5 into its base position when the insert 31 is pulled out from the illuminating arrangement 1 in the direction of arrow 81.

FIG. 3 shows a circuit diagram of the illuminating arrangement 1 in a state corresponding to that shown in FIG. 1 wherein the main lamp 7 provides illumination. A current or voltage source 83 supplies the main lamp 7 with energy in accordance with the position of switch 77 shown in FIG. 3. In the reserve position corresponding to FIG. 2, the switch 77 would switch the reserve lamp 9 into the current circuit which includes current source 83 and thereby cause the reserve lamp 9 to provide illumination.

In the base position wherein the main lamp 7 provides illumination, a switching unit 85 detects the current flowing through the main lamp 7. If the main lamp 7 becomes defective, then the current flowing through the main lamp 7 would be less than a pregiven threshold value. In this case, the switching unit 85 closes a switch 87 which closes a current circuit and excites the magnet 15. The current circuit includes a further current source 89 and the magnet 15. In this way, the lamp carrier 5 is pivoted into the reserve position as described above and the switch 77 is switched over thereby activating the reserve lamp 9 so that the latter provides illumination.

It is understood that the foregoing description is that of the preferred embodiments of the invention and that various changes and modifications may be made thereto without departing from the spirit and scope of the invention as defined in the appended claims.

What is claimed is:

1. An illuminating arrangement comprising:
   a frame;
   a lamp carrier;
   a main lamp and a reserve lamp mounted on said lamp carrier in spaced relationship to each other;
   said lamp carrier being pivotally mounted on said frame so as to be movable from a base position wherein said main lamp provides illumination into a reserve position wherein said reserve lamp provides illumination;
   a position change mechanism for automatically moving said lamp carrier from said base position into said reserve position when said main lamp becomes defective;
   a housing;
   an insert movable between a withdrawn position wherein said insert extends out of said housing and an insert position wherein said insert is seated in said housing; and,
   said frame, said lamp carrier and said position change mechanism being mounted on said insert.

2. The illuminating arrangement of claim 4, said position change mechanism including a device for fixing said lamp carrier in said base position.

3. The illuminating arrangement of claim 4, further comprising a latch mechanism for fixing said lamp carrier in said reserve position.

4. The illuminating arrangement of claim 1, further comprising an insert latch device for fixing said insert in said insert position in said housing.

5. The illuminating arrangement of claim 4, further comprising a return device for acting on said lamp carrier to return said lamp carrier to said base position as said insert is moved from said insert position to said withdrawn position.

6. The illuminating arrangement of claim 5, wherein said lamp carrier includes an indicator for indicating when said lamp carrier is in said reserve position and said reserve lamp is in service; and, said indicator being pivoted out of said housing when said lamp carrier moves into said reserve position.

7. The illuminating arrangement of claim 6, said position change mechanism including:
   a spring mounted on said frame for resiliently biasing said lamp carrier into said reserve position; and,
   a magnetically actuable control device for controlling said spring by releasing said lamp carrier from said base position whereby said lamp carrier is moved under the force of said spring into said reserve position.

8. The illuminating arrangement of claim 7, further comprising a release element for manually actuating said control device.

9. The illuminating arrangement of claim 1, further comprising a light conductor for transmitting the light from said lamps to a remote location; and, a coupling device for coupling said light conductor to said housing.

10. The illuminating arrangement of claim 9, said coupling device being a detent coupling mechanism for establishing a fixed pregiven positional relationship between an end face of said light conductor and the particular one of said lamps providing illumination.

* * * * *

UNITED STATES PATENT AND TRADEMARK OFFICE
CERTIFICATE OF CORRECTION

PATENT NO. : 5,980,053
DATED : November 9, 1999
INVENTOR(S) : Norbert Hauser, Claus-Peter Brueckner and Heiko Reinke It is certified that error appears in the above-identified patent and that said Letters Patent is hereby corrected as shown below:

Column 6,
Lines 21 & 24, delete "claim 4," and substitute -- claim 1, -- therefor.

Signed and Sealed this

Eighth Day of January, 2002

Attest:

JAMES E. ROGAN
Attesting Officer        Director of the United States Patent and Trademark Office